Aug. 31, 1926.
O. JACOBSEN
PUMP
Original Filed Dec. 16, 1925
1,598,138
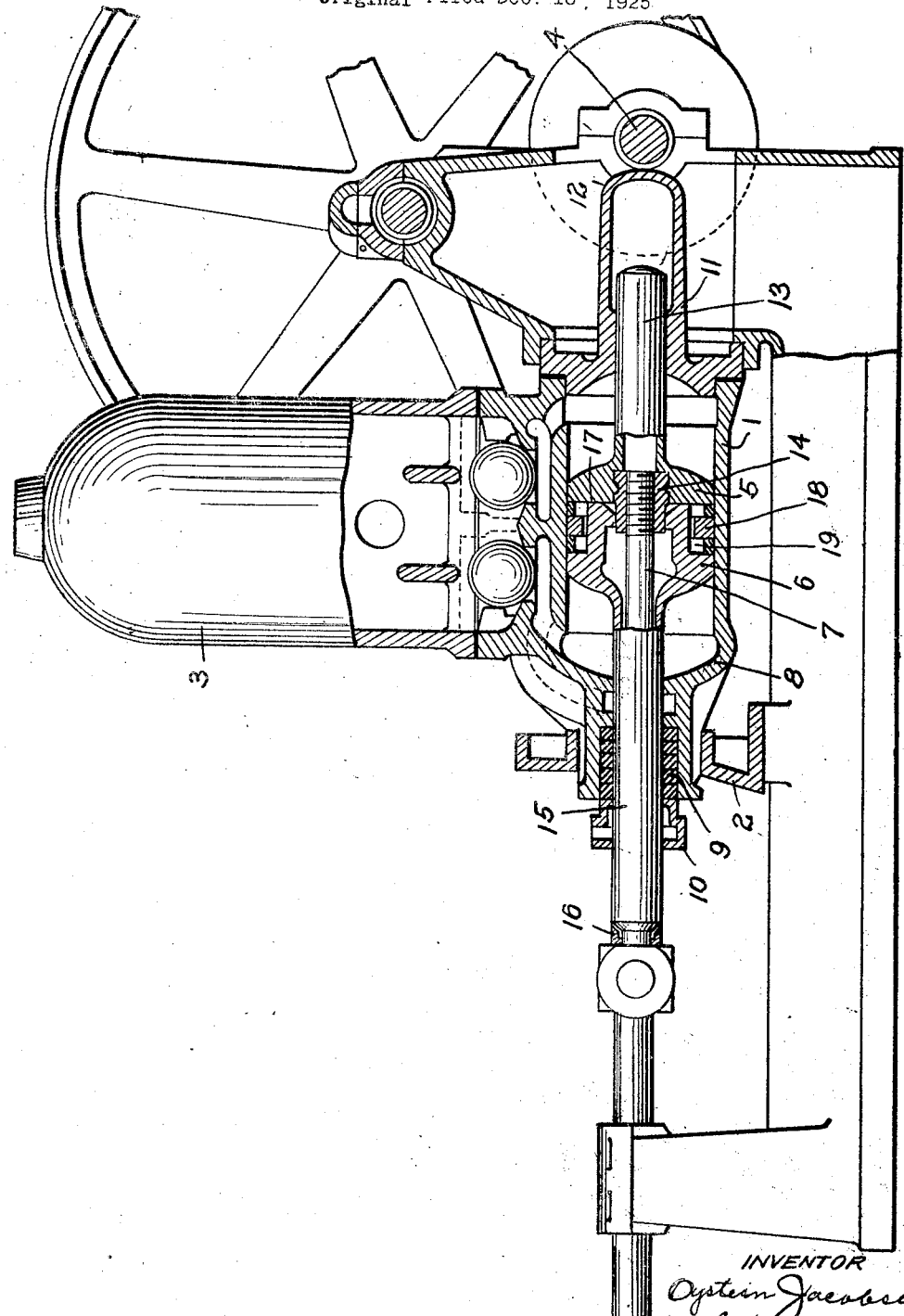
INVENTOR
Oystein Jacobsen
by
James C. Brasey
atty Patented Aug. 31, 1926.

1,598,138

UNITED STATES PATENT OFFICE.

OYSTEIN JACOBSEN, OF DAYTON, OHIO, ASSIGNOR TO THE DURIRON COMPANY, INC., A CORPORATION OF NEW YORK.

PUMP.

Original application filed December 16, 1925, Serial No. 75,732. Divided and this application filed April 13, 1926. Serial No. 101,708.

The invention relates to pumps of the plunger type and particularly to pumps for handling acids or other corrosive liquids, although not limited to use in handling such liquids. The present application constitutes a division of my copending application, Serial Number 75,732, and has for its principal objects, the provision of an improved pump construction of the corrosion resisting type having an improved plunger or piston construction involving an advantageous combination of corrosion resisting materials, with a reinforcing shaft of a tougher material protected thereby, wherein the parts may be readily fabricated and assembled and disassembled. One embodiment of the invention is illustrated in the accompanying drawing, wherein:

The figure is a vertical section through the pump.

Referring to the drawing, 1 is the cylinder casing mounted upon the base 2, and carrying an air chamber casing 3, which is secured in position by bolts, not shown. The two part plunger 5, 6, provided with a piston rod 7 works in the cylinder and is operated from the shaft 4 by suitable means, not shown. The forward head 8 of the cylinder is integral with the body portion and provided with the packing 9 and follower 10. The rear head 11 of the cylinder is removable, being held by bolts, not shown, and is provided with a tubular guide member 12 closed at its outer end and receiving the guide member 13 integral with the rear section 5 of the piston.

The casings 1 and 3, the cylinder head 11, and the piston sections 5 and 6 are all castings of corrosion resisting material, such as high silica iron or aluminum bronze, and are relatively hard and brittle, as compared with wrought metal. The piston rod 7 is of strong tough material, such as steel shafting. This rod is threaded into the sleeve 14 at its rear end, such sleeve also being of tough, wrought metal and being embedded in the piston section 5 by casting the metal of such section into a mold with the sleeve supported therein. The forward section 6 of the piston is provided with a tubular portion 15 integral therewith, and surrounding the piston rod 7, and acting as a protector therefor. This tubular portion extends through the packing 9 and is engaged at its end by the collar 16, swiveled on the piston rod. By rotating the rod 7 or the rear piston section 5, the threaded end of the rod is screwed into the sleeve 14 clamping the piston sections tightly together, and placing the rod 7 under tension and the tubular portion 15 under compression.

This arrangement insures a tight joint between the two piston sections at 17, at which point the surfaces are carefully ground, in order to make a tight contact and prevent the access of corrosion liquid to the rod 7 and sleeve 14. The arrangement also provides for the ready insertion and removal of the piston rings 18, such rings being seated in a groove 19, which extends to the rear end of the section 6, so that the separation of the sections 5 and 6 leaves the rings free for removal. The space provided in this groove is such that the rings do not interfere with proper contact between the piston sections at 17 when the piston rod is screwed into the sleeve 14 to clamp the sections together.

What I claim is:

1. In combination in a pump, a cylinder casing of corrosion resisting material, a piston of corrosion resisting material in two sections, one behind the other and fitting together with a tubular portion extending forward from the forward section of the piston and integral therewith and constituting a piston rod protector, packing in the cylinder casing surrounding said tubular portion, a sleeve of strong tough metal embedded in the center of the rear section of the piston and threaded internally, a piston rod of strong tough metal threaded at one end into said sleeve and extending through said tubular portion, and cooperating means between the outer ends of the piston rod and said tubular portion for holding them securely against relative longitudinal movement.

2. In combination in a pump, a cylinder casing of corrosion resisting material, a piston of corrosion resisting material in two sections, one behind the other and fitting together with a tubular portion extending forward from the forward section of the piston and integral therewith and constituting a piston rod protector, packing in the cylinder casing surrounding said tubular portion, a sleeve of strong tough metal embedded in the center of the rear section of the piston and threaded internally, a piston rod of strong tough metal threaded at one end into said sleeve and extending through said tubular portion, and cooperating means between the outer ends of the piston rod and said tubular portion for holding them securely against relative longitudinal movement with the piston rod under tension and said tubular portion under compression.

3. In combination in a pump, a cylinder casing of corrosion resisting material, a piston of corrosion resisting material in two sections, one behind the other and fitting together with a tubular portion extending forward from the forward section of the piston and integral therewith and constituting a piston rod protector, packing in the cylinder casing surrounding said tubular portion, a sleeve of strong tough metal embedded in the center of the rear section of the piston and threaded internally, a piston rod of strong tough metal threaded at one end into said sleeve and extending through said tubular portion, and a retaining collar swiveled on the piston rod and bearing against the outer end of said collar.

4. In combination in a pump, a cylinder casing of corrosion resisting material, a piston of corrosion resisting material in two sections, one behind the other and fitting together with a tubular portion extending forward from the forward section of the piston and integral therewith and constituting a piston rod protector, packing in the cylinder casing surrounding said tubular portion, a sleeve of strong tough metal embedded in the center of the rear section of the piston and threaded internally, a piston rod of strong tough metal threaded at one end into said sleeve and extending through said tubular portion, and cooperating means between the outer ends of the piston rod and said tubular portion for holding them securely against relative longitudinal movement, a groove being provided around the piston at the joint between the two sections and a piston ring being mounted in such groove.

5. In combination in a pump, a cylinder casing of corrosion resisting material, a piston of corrosion resisting material in two sections, one behind the other and fitting together with a tubular portion extending forward from the forward section of the piston and integral therewith and constituting a piston rod protector, packing in the cylinder casing surrounding said tubular portion, a sleeve of strong tough metal embedded in the center of the rear section of the piston and threaded internally, a piston rod of strong tough metal threaded at one end into said sleeve and extending through said tubular portion, cooperating means between the outer ends of the piston rod and said tubular portion for holding them securely against relative longitudinal movement, a rear cylinder head of corrosion resisting material having a tubular guide member projecting rearwardly, and a guide stem circular in cross section integral with the rear piston section and fitting into said guide member.

6. In combination in a pump, a cylinder casing of corrosion resisting material, a piston of corrosion resisting material in two sections, one behind the other and fitting together with a tubular portion extending forward from the forward section of the piston and integral therewith and constituting a piston rod protector, packing in the cylinder casing surrounding said tubular portion, a sleeve of strong tough metal embedded in the center of the rear section of the piston and threaded internally, a piston rod of strong tough metal threaded at one end into said sleeve and extending through said tubular portion, cooperating means between the outer ends of the piston rod and said tubular portion for holding them securely against relative longitudinal movement, a rear cylinder head of corrosion resisting material having a tubular guide member projecting rearwardly, and a guide stem circular in cross section integral with the rear piston section and fitting into said guide member, said tubular guide member being closed at its outer end.

7. In combination in a pump, a cylinder casing of corrosion resisting material, having its forward end integral with the body of the casing and its rear head removable, a piston of corrosion resisting material in two sections, one behind the other and fitting together with a tubular portion extending forward from the forward section of the piston and integral therewith and constituting a piston rod protector, packing in the cylinder casing surrounding said tubular portion, a sleeve of strong tough metal embedded in the center of the rear section of the piston and threaded internally, a piston rod of strong tough metal threaded at one end into said sleeve and extending through said tubular portion, and cooperating means between the outer ends of the piston rod and said tubular portion for holding them securely against relative longitudinal movement.

In testimony whereof, I have hereunto subscribed my name this 9th day of April, 1926.

O. JACOBSEN.